Feb. 20, 1962     E. E. PRATHER     3,021,821
AUTOMATIC BRAKE HOLDING SYSTEM
Original Filed Oct. 23, 1957
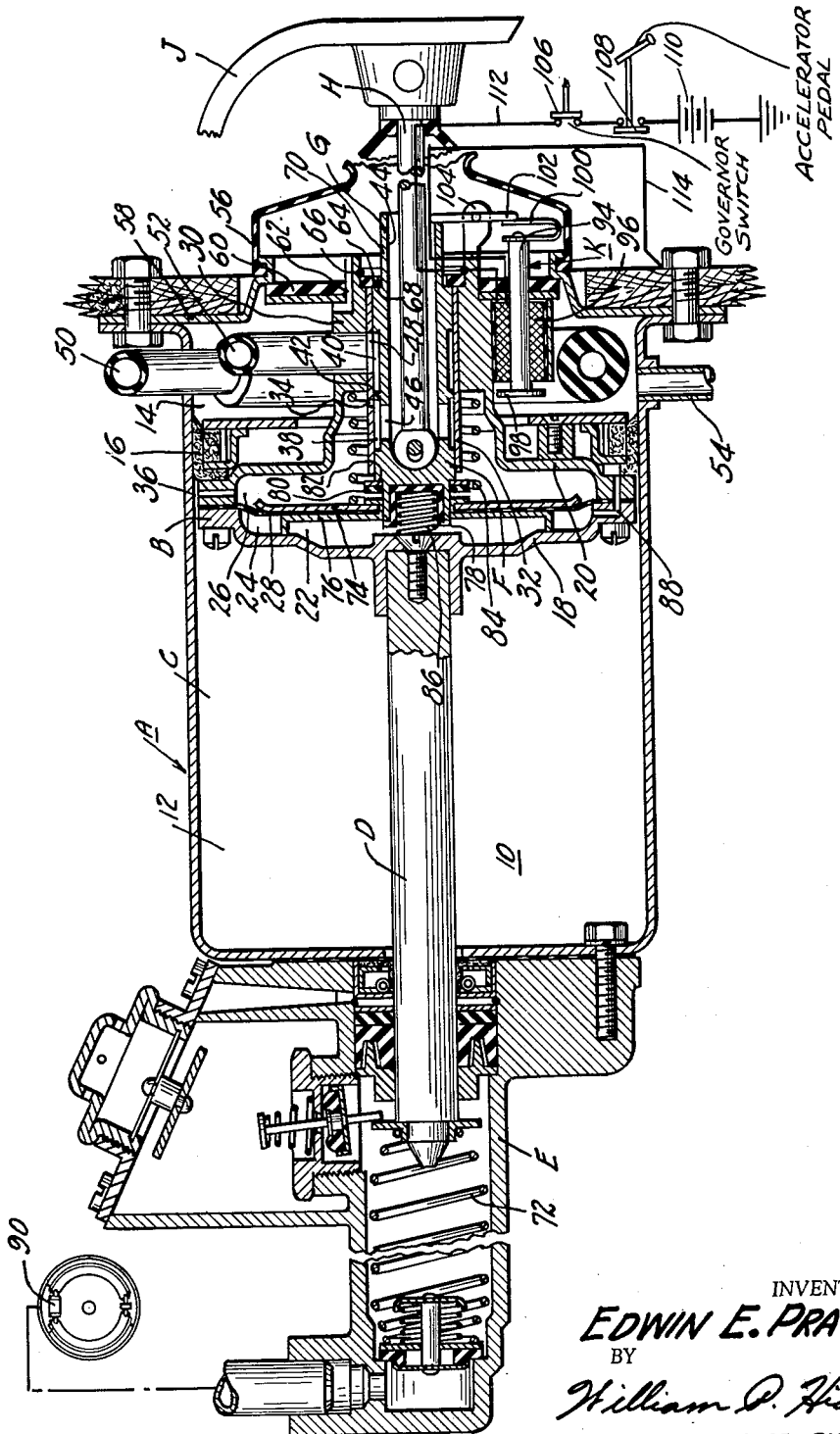
INVENTOR.
EDWIN E. PRATHER
BY
William P. Hickey
ATTORNEY : 3,021,821
Patented Feb. 20, 1962

3,021,821
AUTOMATIC BRAKE HOLDING SYSTEM
Edwin E. Prather, South Bend, Ind., assignor to The Bendix Corporation, a corporation of Delaware
Original application Oct. 23, 1957, Ser. No. 691,877, now Patent No. 2,973,844, dated Mar. 7, 1961. Divided and this application Dec. 8, 1959, Ser. No. 858,263
8 Claims. (Cl. 121—41)

The present invention relates to servomotors of a type having a control member whose actuating movement is opposed by reaction means; and more particularly to a pneumatically powered servomotor having control valve means mounted on its pressure actuated element and in which means are provided to oppose actuating movement of the control member by an amount generally proportional to the force being delivered by the servomotor. The present application is a division of my copending application 691,877 filed October 23, 1957, now Patent No. 2,973,844.

An object of the present invention is the provision of a new and improved servomotor having a control member whose actuating movement is opposed by means providing a reaction generally proportional to the force being delivered by the servomotor, and further comprising means which under certain control conditions biases the control member in an actuating direction by a generally predetermined force that is opposed by the reaction means to cause the servomotor to be actuated to provide a generally predetermined output force.

A more specific object of the present invention is the provision of a new and improved pneumatic powered fluid pressure servomotor of a type having control valve means mounted directly on the servomotor's pressure actuated element, and further comprising means mounted on the pressure actuated element and which can be caused to actuate the control member with a generally predetermined force that is opposed by the servomotor's reaction means to cause the servomotor to be actuated at a generally predetermined level of energization.

A still more specific object of the present invention is the provision of a new and improved servomotor of the above mentioned type for the actuation of the braking system of an automotive vehicle having a governor switch and a throttle controlled switch which will cause the servomotor to actuate the braking system with a generally predetermined force when the throttle is closed and the vehicle is traveling below a predetermined speed to provide what is commonly called "no creep."

A still further object of the present invention is the provision of a new and improved "no creep" braking system for an automotive vehicle, and/or a servomotor of a type to be used therein, which is simple and rugged in construction, reliable and efficient in its operation, and is inexpensive to manufacture.

The invention resides in certain constructions and combinations and arrangements of parts, and further objects and advantages of the present invention will be present to those skilled in the art to which the invention relates from the following description of the preferred embodiment described with reference to the accompanying drawing forming a part of this specification.

Although the invention may be embodied in other types of servomotors, it is herein shown and described as embodied in a pneumatic powered fluid pressure servomotor of the type used to actuate the hydraulic braking system of an automotive vehicle. The drawing is a schematic view of an automotive braking system in which a servomotor embodying principles of the present invention is shown in section. The servomotor A shown is of the "atmospheric submerged type" which is energized or actuated when vacuum from the vehicle's engine is admitted to the servomotor. The servomotor A generally comprises a pressure responsive movable wall or piston B which is mounted in a power chamber or cylinder C, and which is adapted to actuate a driven or fluid displacement member D which projects into a hydraulic cylinder E suitably affixed to one end of the power cylinder C. Actuation of the unit is regulated by a control valve F having a movable control member G, which is adapted to be positioned by a push rod H connected to the foot pedal lever J of the vehicle. The control valve F and control member G are so constructed and arranged that manual force on the control member G will be transmitted directly to the driven member D during power failure of the servomotor.

The internal chamber 10 of the cylinder C is divided into inner and outer opposing chambers, 12 and 14 respectively, by the pressure responsive movable wall or piston B which carries suitable sealing means 16 on its radially outer edges for providing a seal with respect to the sidewalls of the internal chamber 10. The power piston B is formed by means of front 18 and rear 20 die-cast sections suitably bolted together to provide an internal reaction chamber 22 which in turn is divided into front and rear opposing reaction chambers 24 and 26 respectively by a diaphragm 28, the outer edges of which are clamped between the die cast sections 18 and 20.

The control valve F is formed in an axially rearwardly extending boss 30 in the rear die cast section 20 by means of a brass sleeve 32 pressed into the boss, and the movable control member G which is slidably received within the sleeve 32 to form a slide valve structure. A control port or opening 34 is provided in the sleeve 32 to communicate the inside of the sleeve 32 with the outer opposing chamber 26, from which the control pressure is continually communicated with the forward opposing chamber 12 of the servomotor by means of a suitable passage 36 in the power piston B.

The control member G is constructed and arranged to control communication of the control port 34 with atmospheric or vacuum pressures and thereby control the pressure within the inner opposing chamber 12. The outer surface of the cylindrically shaped control member G is provided with front and rear annular recesses 38 and 40 respectively which are separated by means of a land portion 42 which has a generally sliding sealing fit with respect to the inner walls of the sleeve 32. The movable control member G is drilled axially at 44 from its outer or rearwardly positioned end to provide communication with a transverse drilling 46, which intersects the front annular recess 38 and provides continuous atmospheric communication therewith. A transverse drilling 48 is provided through the boss 30 and sleeve 32 to at all times provide vacuum communication with the rear annular recess 40 of the movable control member G. Vacuum from the manifold of the propelling engine of the vehicle is supplied to the transverse drilling 48 by means of a vacuum conduit 50 having first and second rigid portions connected with the boss 30 and sidewalls of the cylinder C respectively, and having an intermediate flexible portion formed by means of a section of rubber hose 52. Atmospheric pressure is continually supplied to the rear opposing chamber 14 through the connection 54. A rubber dirt seal or boot 56 is provided between the rear cover plate 58 and the push rod H; and atmospheric pressure from the rear opposing chamber 14 is continually communicated to the inside of the rubber boot 56, and hence around the outer end of the boss 30 to the rearwardly positioned end of the control member G. A rubber coated abutment washer 60 is provided on the boss 30 for engagement with the rear cover plate 58 during the deenergized condition of the servomotor, in which position its power piston B is fully retracted. Atmospheric pressure is transmitted thereacross in this position by means of a suitable passage 62 in the boss 30.

A return stop is provided for the movable control member G by means of an annular nonmetallic washer 64 held in a recess in the rear end of the boss 30 by means of a snap ring 66 at such a position as to contact a shoulder 68 on the control member G as provided by means of an outer reduced diameter section 70 of the control member G. In the position shown in the drawing, wherein the control member G is in engagement with the nonmetallic washer 64, the land portion 42 of the control member will be positioned just rearwardly from the control port 34, such that atmospheric pressure will be communicated to both the rear opposing reaction chamber 26 and the forward opposing chamber 12. Atmospheric pressure is, therefore, communicated to both sides of the power piston B, and the power piston B will be held in its deenergized or retracted position, previously described, by means of a coil spring 72 in the hydraulic cylinder E.

Actuation of the servomotor is obtained by moving the control member G forwardly or inwardly to move the land portion 42 past the outer edge of the control port 34, and thereby communicate vacuum from the rear annular recess 40 with the rear opposing reaction chamber 26 and forward opposing chamber 12 to bias the power piston B forwardly or inwardly and drive the displacement member D into the hydraulic cylinder E.

Reaction or "feel" is provided against the control member G to bias the control member G toward its deenergized or retracted position with a force generally proportional to that being delivered by the displacement member D to thereby appraise the operator of the amount of force being delivered by the servomotor. The center portion of the diaphragm 28 is stiffened by front and rear plates 76 and 74 respectively, and the radially inner edge of the front annular plate 76 is bent rearwardly around the rear annular plate 74 to provide a sliding sealing fit with the inner end of the movable control member G. Rearward movement of the diaphragm structure 28 is limited by a rubber coated annular washer 80 positioned against the shoulder 82 provided by the inner reduced diameter section 78; and a delay reaction coil spring 84 biases the diaphragm 28 forwardly away from the washer 80 into abutment with the inner end of the reaction chamber 22. A control member return spring 86 is positioned between the inner end of the movable control member G and the inner end wall of the reaction chamber 22 to provide an initial force which biases the movable control member G into its retracted position when no pressure differential exists across the diaphragm 28. Atmospheric pressure is continually supplied to the forward opposing reaction chamber 24 by a suitable passageway 88 such that the same pressure differential being delivered across the power piston B will be experienced across the reaction diaphragm 28, but in a reverse direction to oppose the control movement of the control member G.

As previously explained, the servomotor is of the atmospheric submerged type in which atmospheric pressure is communicated to both of the opposing chambers 12 and 14 respectively when the servomotor is deenergized. Operation of the servomotor structure so far described is initiated by the depressing of the foot pedal lever J whereupon the push rod H forces the movable control member G forwardly within the sleeve 32 causing the land portion 42 to be moved forwardly of the rear edge of the control port 34, and thereby communicate vacuum with the inner opposing chamber 12 of the servomotor. Forward movement of the control member G, causes a pressure differential to be provided across the power piston B which biases the displacement member D into the hydraulic cylinder E. Fluid displaced from the hydraulic cylinder E is conducted to the brake applying wheel cylinders 90 (only one of which is shown) of the vehicle to produce a braking application whose intensity is directly proportional to the force delivered upon the fluid displacement member D. Vacuum communication between the rear annular recess 40 and the control port 34 will continue until such time as the pressure differential across the reaction diaphragm 28 is sufficient to produce a force which overcomes the delayed reaction coil spring 84 to bias the diaphragm 28 into engagement with the rubber coated washer 80. When the pressure differential across the diaphragm produces a force which substantially equals that being applied by the operator upon the foot pedal lever J, diaphragm 28 will move the control member G rearwardly to cause the land portion 42 to close off or isolate the control port 34 from both of the recesses 38 and 40—thereby preventing further pressure change within the rear opposing reaction chamber 28 and the forward opposing chamber 12. The position of the power piston B within the power cylinder C, at this time, will be determined by the amount of fluid which was displaced from the hydraulic cylinder E in order that the pressure force upon the displacement member D exactly equals that being applied thereto by the servomotor.

When it is desired to reduce the braking effort being developed by the servomotor, the foot pedal lever J may be retracted to cause the land portion 42 to be moved rearwardly sufficiently to permit atmospheric communication between the forward annular recess 38 and the control port 34—thereby decreasing the pressure differential across the diaphragm 38 and the power piston B. This reduction in pressure will continue until such time as the pressure differential across the diaphragm 38 no longer exceeds the force being held against the control member G by the foot of the operator; whereupon the piston will move rearwardly relative to the control member sufficiently to cause the land portion 42 to close off the control port 34. A complete removal of applying effort upon the foot pedal lever J will, of course, permit the coil spring 72 to move the control member G into engagement with the nonmetallic washer 64 to permit full atmospheric pressure to be delivered to the inner opposing chamber 12. Complete release of pressure differential across the power piston B thereby permits the coil spring 72 to move the power piston B into its retracted position wherein the abutment washer 60 is in engagement with the rear cover plate 58 as shown in the drawing. It should also be stated, that upon power failure, actuation of the foot pedal lever J will move the control member G inwardly against the inner wall of the reaction chamber 22 to permit the fluid displacement member D to be forced forwardly by the manual effort applied directly against the control member G.

The servomotor structure shown in the drawing is completed by control means K which actuates or biases the control member G forwardly with a generally predetermined force to cause the servomotor to be energized to a predetermined level, such that a generally predetermined hydraulic pressure will be developed in the hydraulic cylinder E and the brakes of the vehicle will be applied by that effort. The control means K, shown, comprises a solenoid whose coil is mounted directly upon the power piston D in such manner that its armature 94 will be biased rearwardly when its coil 96 is energized. The forward end of the armature 94 is provided with a stop 98 which abuts the forward end of the coil 96 to limit the amount of rearward movement of the armature 94, and the rear end of the armature 94 is connected to one end of a compression leaf spring 100. The other end of the compression spring 100 bears against one end of a lever 102 which is pinned at its center to a bifurcated projection 104 on the boss 30, and the other end of the lever bears against the rearwardly positioned end of the control member G to cause the control member G to be biased forwardly when the coil 96 is energized. It will therefore be seen that energization of the coil 96 will cause a generally predetermined actuating force to be delivered to the control member G—which force, of course, will be opposed by the reaction diaphragm 28 to cause a generally predetermined pressure differential to be delivered across the power piston B, and a generally predetermined force to thereby be delivered to the displacement member D.

As previously indicated the servomotor A shown in the drawing is adapted to be used to actuate the hydraulic braking system of an automotive vehicle in such manner as to apply the brakes of the vehicle applied when the vehicle is traveling at a speed below a generally predetermined rate. Such systems are commonly called "no creep" systems and are designed to permit the operator to hold the brakes applied between the time that the operator's foot is removed from the brake pedal lever and is applied to the accelerator pedal. A governor switch 106 is provided in the electrical supply circuit for the coil 96, which switch is closed at speeds below approximately 5 miles per hour, and is open at speeds above approximately 5 miles per hour. The electrical supply circuit for the coil 96 also includes a normally closed switch 108, which switch is adapted to be opened whenever the accelerator pedal of the vehicle is moved out of its retracted position. The electrical supply circuit will also include the vehicle's battery 110, the connecting wire 112 leading to the coil 96, and the connecting wire 114 which grounds the other end of the coil 96 to the rear cover plate 98 of the servomotor.

The control means K is brought into operation or is adapted to actuate the servomotor A whenever the automotive vehicle is traveling at a speed below approximately 5 miles per hour and the accelerator pedal is in its retracted position. At such a time both the contacts of the governor switch 106 and the contacts of the throttle controlled switch 108 will be closed. The resulting energization of the coil 96 will bias the armature 94 rearwardly until the stop 98 moves into engagement with the end of the coil 96 so as to deform the compression spring 100 by a generally predetermined amount, and thereby deliver a generally predetermined force upon one end of the lever 102. This force will be delivered through the lever 102 to the movable control member G, biasing it forwardly sufficiently to cause the land 42 to move past the rear edge of the control port 34, and thereby communicate vacuum with the rear opposing reaction chamber 26 and the forward opposing chamber 12 of the servomotor. Vacuum continued to flow to each of these chambers until such time as sufficient differential pressure is developed across the reaction diaphragm 28 to oppose the force being delivered against the movable control member G by the compression spring 100; whereupon, the control member G will be moved rearwardly causing the land portion 42 to close off the control port 34. Further vacuum communication to the outer opposing reaction chamber 26 and inner opposing chamber 12 will thereafter be prevented and the displacement member D will be held applied by a generally predetermined force. This, of course, will produce a braking application of generally predetermined intensity.

When it is desired to get the vehicle under way again, a depressing of the accelerator pedal will open the switch 108 to deenergize the coil 96—thereby disabling the control means K. At speeds above approximately 5 miles per hour, the governor switch 106 will always be open; so that the accelerator pedal may be released, and the switch 108 closed without resulting in a dragging of the brakes.

While the present invention has been described as embodied in a fluid pressure servomotor for actuating the brakes of an automotive vehicle, it is not so limited; and it is intended that the spirit of the invention may be embodied in still other types of servomotors. While the control means K has been described as being actuated upon an energization of the coil 96, the invention is not so limited; inasmuch as the armature could be actuated by means of a spring whose force would be held off at speeds above approximately 5 miles per hour by means of the energization of the coil 96. Under such conditions, of course, the governor switch 106 would be a normally open one which becomes closed at speeds above approximately 5 miles per hour, and the switch 108 would be a normally open switch which would be closed when the accelerator pedal was moved out of its released or retracted position.

While the invention has been described in considerable detail, I do not wish to be limited to the particular constructions shown and described, and it is my intention to cover hereby all novel, adaptations, modifications, and arrangements thereof which come within the practice of those skilled in the art to which the invention relates.

I claim:

1. A servomotor comprising: a support, a power actuated member mounted in said support, control means carried by said power actuated member and having a control element which when moved in one direction causes said power actuated member to move a first direction, reaction means opposing actuating movement of said control element by an amount generally proportional to the delivered force of said power actuated member first means for normally moving said control member in said one direction and a solenoid carried by said power actuated member including an armature operatively connected to actuate said control element and whereby an override of said first means is accomplished by said solenoid.

2. A servomotor comprising: a support, a power actuated member mounted in said support, control means carried by said power actuated member and having a control element which when moved in one direction causes said power actuated member to move in a first direction, reaction means opposing actuating movement of said control element by an amount generally proportional to the delivered force of said power actuated member, a solenoid carried by said power actuated member including an armature, and an operative connection between said armature and said control element, said operative connection including a spring and means for limiting the degree of movement which can be applied to said spring by said armature to thereby limit the degree of actuation of said servomotor which said solenoid can produce.

3. A servomotor comprising: a support, a power actuated member mounted in said support, control means carried by said power actuated member and having a control element which when moved in an actuating direction causes said power actuated member to move in a first direction, reaction means opposing actuating movement of said control element by an amount generally proportional to the delivered force of said power actuated member, a solenoid carried by said power actuated member including an armature, means including a spring for transmitting actuating movement of said armature to bias said control element in its actuating direction, and means limiting the actuating movement of said armature, whereby a predetermined degree of power actuation of said servomotor is accomplished by said solenoid.

4. A fluid pressure servomotor comprising: a support, a pressure responsive movable wall mounted in said support, control valve means carried by said pressure responsive movable wall and having a control element which when moved in an actuating direction causes said movable wall to move in a first direction, reaction means opposing actuating movement of said control element by an amount generally proportional to the delivered force of said movable wall, a solenoid carried by said movable wall including an armature, means including a spring for transmitting actuating movement of said armature to bias said control element in its actuating direction, and means limiting the actuating movement of said armature, whereby a predetermined degree of power actuation of said servomotor is accomplished by said solenoid.

5. In a fluid pressure servomotor for actuating a driven device: a pressure responsive member for actuating said driven device when pressure differential is applied across said member in a given direction, valve means mounted on said pressure responsive member and having a control member which when actuated in said given direction supplies a pressure differential across said pressure responsive member in said given direction, reaction means constructed and arranged to deliver a reaction against said control member which opposes its actuation with a force generally proportional to the force delivered to said driven device by said servomotor, a solenoid mounted on said pressure responsive member in a manner generally parallel with respect to said control member and having an armature therein which is moved a generally predetermined distance in the opposite direction to the control member's actuating movement upon energization of said solenoid, a lever pivoted at its midpoint to said pressure responsive member and having opposite ends which are operatively connected to said control member and said armature, and a compression spring in the operative connection between said lever and said armature, said spring being adapted to supply a predetermined actuating force to said lever when said solenoid is energized, whereby energization of said solenoid causes a predetermined actuating force to be applied to said control member and a generally predetermined force delivered to the driven device by said servomotor.

6. A fluid pressure servomotor comprising: a housing having a power chamber therein, a movable wall in said chamber and which is moved toward one end of said chamber by differential pressure, a control valve carried by said movable wall, said control valve having a control member which when actuated toward said one end causes said movable wall to move toward said one end, means for normally actuating said control member, an armature mounted on said movable wall which when actuated also moves said control member toward said one end, and electrical means carried by said movable wall for actuating said armature.

7. A fluid pressure servomotor comprising: a housing having a power chamber therein, a movable wall in said chamber and which is moved toward one end of said chamber by differential pressure, a control valve carried by said movable wall, said control valve having a control member which when actuated toward said one end causes said movable wall to move toward said one end, reaction means opposing actuating movement of said control member, means for normally actuating said control member, an armature mounted on said movable wall and which when actuated also actuates said control member toward said one end, and electrical means carried by said movable wall for actuating said armature.

8. A fluid pressure servomotor comprising: a housing having a power chamber therein, a movable wall in said chamber and which is moved toward one end of said chamber by differential pressure, a control valve carried by said movable wall, said control valve having a control member which when actuated toward said one end causes said movable wall to move toward said one end, reaction means opposing actuating movement of said control member, means for normally actuating said control member, spring means for biasing said control member toward said one end, an armature mounted on said movable wall and which when actuated causes said spring to bias said control member toward said one end, and electrical means carried by said movable wall for actuating said armature.

References Cited in the file of this patent
UNITED STATES PATENTS

| | | |
|---|---|---|
| 2,192,021 | Weeks | Feb. 27, 1940 |
| 2,317,549 | Muller et al. | Apr. 27, 1943 |
| 2,336,887 | Piron | Dec. 14, 1943 |
| 2,747,697 | Banker | May 29, 1956 |